(12) United States Patent
Lorenzo et al.

(10) Patent No.: US 9,568,284 B2
(45) Date of Patent: Feb. 14, 2017

(54) ENERGY ABSORBER FOR HIGH PERFORMANCE BLAST BARRIER SYSTEM

(71) Applicant: Covestro LLC, Pittsburgh, PA (US)

(72) Inventors: James M. Lorenzo, Mars, PA (US); Robert A. Pyles, Bethel Park, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 15/164,973

(22) Filed: May 26, 2016

(65) Prior Publication Data

US 2016/0265883 A1    Sep. 15, 2016

Related U.S. Application Data

(63) Continuation of application No. 14/424,098, filed as application No. PCT/US2013/032376 on Mar. 15, 2013, now Pat. No. 9,417,038.

(60) Provisional application No. 61/694,407, filed on Aug. 29, 2012.

(51) Int. Cl.
*F41H 5/02* (2006.01)
*F41H 5/04* (2006.01)
*F16F 7/12* (2006.01)

(52) U.S. Cl.
CPC .............. *F41H 5/0457* (2013.01); *F16F 7/12* (2013.01)

(58) Field of Classification Search
USPC ............ 89/36.02, 36.04, 36.07, 36.08
See application file for complete search history.

(56) References Cited

U.S. PATENT DOCUMENTS 7,914,069 B2 * 3/2011 Barbe ............... F41H 7/042
                                              296/193.07
2007/0068377 A1 * 3/2007 Qiao ............... F41H 5/0428
                                              89/36.02

* cited by examiner

*Primary Examiner* — J. Woodrow Eldred
(74) *Attorney, Agent, or Firm* — Richard P. Bender

(57) ABSTRACT

The present invention provides an energy absorber for a blast barrier system comprising a substantially tubular member extending longitudinally along an axis from a first end portion to a second end portion, each of the first end portion and the second end portion having a substantially similar geometric, profile, wherein the energy absorber collapses under a predetermined load when compressed by a residual blast force. The energy absorber of the present invention may help minimize damage to people and structures by further dissipating force from a blast in a blast barrier system.

22 Claims, 17 Drawing Sheets

ENERGY ABSORBER FOR HIGH PERFORMANCE BLAST BARRIER SYSTEM

RELATED APPLICATIONS

This application is a continuation of U.S. Ser. No. 14/424,098, filed Feb. 26, 2015, and which also claims the benefit, under 35 USC §119(e), §120 and/or §365(c) of U.S. Provisional Application No. 61/694,407 filed Aug. 29, 2012 entitled "ENERGY ABSORBING UNIT (EAU) USED WITH HIGH-PERFORMANCE POLYMERIC PANELS TO MITIGATE BLAST DAMAGE" the entirety of which is incorporated herein by reference and PCT/US2013/032376, filed Mar. 15, 2013 entitled "ENERGY ABSORBER FOR HIGH-PERFORMANCE BLAST BARRIER SYSTEM" the entirety of which is incorporated herein by reference.

FIELD OF THE INVENTION

The present invention relates in general to energy absorbers and more specifically to an energy absorbing connector for use in high performance polymeric panels in blast barrier systems.

BACKGROUND OF THE INVENTION

Dynamic structural analysis and physical testing performed to develop energy absorbing connectors used for supporting pre-cast reinforced concrete panels subjected to blast waves is summarized in "Blast Damage Mitigation Using Reinforced Concrete Panels and Energy Absorbing Connectors", by Mark G. Whitney, prepared for the Department of Defense Explosive Safety Board 1996 Explosives Safety Seminar. The manuscript describes Energy Absorbing Units (EAUs) deployed behind concrete panels. Concrete panels are rigid (very high modulus) and consequently, the blast force is transferred directly from the concrete panels to the EAUs with little or no force dissipation provided by the concrete panels.

U.S. Pat. No. 3,933,386, issued to Fannin, describes a bumper assembly of a vehicle which is supported by a pair of energy absorber units each of which incorporates a piston assembly which strokes in an inner cylinder to force gas from an inner chamber to a gas spring chamber through an expansible and contractible control chamber controlled by one-way valves and bleed orifices. On the return stroke, compressed gas in the control chamber exerts a force opposing the gas spring return force exerted on the piston assembly. Gas in the control chamber meters through the bleed orifices into the inner chamber so that the return rate of the piston assembly is effectively controlled and reduced.

Taylor, in U.S. Pat. No. 4,031,978, discloses an energy absorber unit including a cylinder, liquid in the cylinder, a piston for movement into the cylinder for providing a liquid energy absorbing capability, and relatively movable parts associated with the cylinder and having frictional engagement for additionally providing a dry energy absorbing capability. Also disclosed is an energy absorbing unit including a tubular cylinder, a first tubular member slidable on the cylinder for carrying a force receiving member, and a second tubular member mounted on the first tubular member for mounting the first tubular member on a supporting member. An energy management system for a vehicle having a frame, an engine mounted on the frame and a bumper, including a first energy absorber unit mounted between the engine and the bumper and a plurality of second energy absorber units mounted between the bumper and the frame is further described.

U.S. Pat. No. 4,054,311, issued to Gute, provides an energy absorbing unit for a vehicle bumper support having inner and outer telescoping cylinders with primary valve for metering fluid between a pair of contractible and expansible fluid chambers to dissipate impact energy. An auxiliary pressure relief valve internal of the unit in parallel with the primary valve opens in response to predetermined pressure buildup in one of the chambers to control pressure and prevent damage to the unit. A gas spring in the unit moves the two cylinders in their extended position on removal of bumper impact load.

Petry, in U.S. Pat. No. 4,097,080, describes a pair of telescopic energy absorbers which are employed to mount a laterally extending bumper to the side rails of a vehicle frame. A mechanical interlock prevents relative rotation of the components of the energy absorbers so that the side rails are rigidly coupled by the bumper to increase their structural strength and to reduce vehicle shake.

U.S. Pat. No. 4,149,742, issued to Fannin et al., discloses an energy absorber incorporating a mounting bracket secured to a vehicle which by track and follower mechanism slidably mounts a support bracket that is secured to a vehicle bumper. One bracket supports a laterally extending energy absorbing band of resilient material engaged by the follower carried by the other bracket. On impact, the brackets telescope inwardly and an intermediate portion of the band is displaced by the follower to effect band deflection and energy absorption. On rebound, the band gradually restores to its original configuration to return the brackets and bumper to its pre-impact position.

Lura, in U.S. Pat. No. 4,178,028, provides an energy absorber yieldably coupling a bumper to a support structure on a vehicle and comprises a spring bracket assembly which includes a pair of diverging spring arms which carry pins on the ends thereof. A preloaded yieldable energy absorbing band of resilient plastic material is stretched across the arms, by attachment to the spaced pins. On impact of the bumper, the pins are displaced outwardly from one another as the spring arms are deflected to stretch the energy absorbing band. The deflection of the spring arms and the stretching of the energy absorber absorbs impact energy.

U.S. Pat. No. 4,830,418, issued to Gest, describes telescopic energy absorber units having outer tubes threaded into connection with vehicle hard bar bumper or fascia support to permit fore and aft adjustment by rotation of the piston tube of the unit in clockwise or counterclockwise direction.

Carlqvist in U.S. Pat. No. 5,003,832, discloses a motion transmitting mechanism for heat engines, refrigerating machines and heat pumps which are hermetically sealed or provided with rotary shaft seals and have reciprocating pistons connected to the motion transmitting mechanism by means of connecting rods, which is provided with two counter rotating crank systems which are centered along a single center line, whereby the lateral forces of the pistons counteract each other so as to be eliminated and allow the use of permanent grease-lubricated and sealed rolling bearings.

U.S. Pat. No. 5,823,705, issued to Jackson et al., provides a restraining barrier which is positionable across a roadway in a deployed position to define a restraining zone and may be moved vertically to a passive position by first and second transport components. Opposite ends of the barrier are coupled to the first and second transport components, respectively, and also couple the barrier to first and second energy absorbers of differing restraintive force in order stop vehicles of varying weight. A support cable is coupled to an indicator for providing a signal indicating vehicle impact. Additionally, a series of restraining barriers and energy absorbers may provide a series of sequentially differing restraintive forces to stop lightweight and heavier vehicles. The barrier of Jackson et al. may be a net and include a lower wire below the net assuring effective trapping of autos and trucks of a variety of heights.

Stewart et al., in U.S. Pat. No. 6,000,738, describe a vehicle bumper including a hollow tubular wall structure adapted to span the front or rear end of an automotive vehicle so as to absorb crash forces when the vehicle is involved in a crash situation at vehicle speeds above some predetermined speed level, e.g., five miles per hour. The hollow tubular wall structure includes an outer wall disposed to receive the crash force, an inner wall connectable to the vehicle, and four connector walls joining the outer wall to the inner wall. The four connector walls bend at a controlled rate to absorb crash energy. The outer and inner walls have aligned air openings adapted to conduct ram air to the vehicle radiator.

U.S. Pat. No. 6,554,530, issued to Moore, discloses an energy absorbing system to protect vehicle drivers and the like from serious injury which may occur when the vehicle strikes a wall or other rigid structure. The system utilizes a plurality of energy absorbing units having hinged plates with a cushion backing which dampens the impact by swinging in an overlapping fashion. The plates are formed from steel and the cushion is formed with a high density outer polymeric casing and relatively low density filler within.

Payne et al., in U.S. Pat. No. 6,814,246, provide a collision attenuating system for a moving vehicle including an energy-absorbing airbag assembly dimensioned and configured for attenuating the impact between the moving vehicle and a pedestrian or an impacted vehicle located in or crossing the path of the moving vehicle as the pedestrian or impacted vehicle impacts against the airbag assembly, a mounting bracket dimensioned and configured for being affixed to the moving vehicle, an engagement bracket affixed to the airbag assembly and engagable with the mounting bracket, and a quick-release fastener for removably engaging the engagement bracket to the mounting bracket for removably mounting the airbag assembly to the moving vehicle. The airbag assembly includes an airbag and an assembly frame supporting the airbag, a speed sensor for determining the speed of the vehicle, and a pressure regulator for controlling a pressure function of the airbag responsive to the speed sensor. The airbag assembly includes an upper deflatable airbag, and a lower pedestrian support, the pedestrian support including energy-absorbing structure. Payne et al. also provide a method of using the collision attenuating system.

U.S. Pat. Nos. 7,360,822, 7,404,593 and 7,625,023 describe a modular energy absorber that is tunable. It comprises one or more energy absorbing modules. The energy absorbing modules have means for coordinating energy absorbing units of the one or more modules. The means for coordinating position and support the units in relation to each other before, during and after relative motion between an incident object and the energy absorber. A crushable member is provided that has an upper perimeter, a lower perimeter and an intermediate section extending therebetween. It also includes a number (m) of breaches defined therein before impact. A method for configuring the modular energy absorber is also described.

Cormier et al., in U.S. Pat. No. 7,625,036, describes a multi-sectional, modular energy absorber comprising one or more modules, which have one or more energy absorbing units. Some have a first section and a second section that are united like a clamshell to form the energy absorbing unit. There is a means for locating the sections in relation to each other. First and second flange sections extend from at least some of the first and second sections. There are means for coordinating energy absorbing units in one of the one or more modules, the means for coordinating having a topography including a number (n) of apertures defined therein, where n is an integer $\geq 0$. At least some of the sections include an upper perimeter, a lower perimeter and an intermediate wall extending therebetween with a number (m) of breaches defined in the intermediate wall before impact, where m is an integer $\geq 0$.

U.S. Pat. No. 7,628,444, issued to Cormier et al., discloses a multi-sectional, modular energy absorber comprising one or more modules, which have one or more energy absorbing units. Some have a first section and a second section in some embodiments that are united like a clamshell to form the energy absorbing unit. There is a means for locating the sections in relation to each other. First and second flange sections extend from at least some of the first and second sections. There are means for coordinating energy absorbing units in one of the one or more modules, the means for coordinating having a topography including a number (n) of apertures defined therein, where n is an integer $\geq 0$. At least some of the sections include an upper perimeter, a lower perimeter and an intermediate wall extending therebetween with a number (m) of breaches defined in the intermediate wall before impact, where m is an integer $\geq 0$. When positioned over an underlying elongate support member, the energy absorption characteristics at the distal ends of the absorber differ from those at its central region.

Gansweidt in U.S. Pat. No. 7,735,427, provides a shock absorber for use as an additional irreversible shock-absorbing stage together with a component for transferring force. To achieve the reliable dissipating of high impact energies, Gansweidt provides a shock absorber comprising: a base plate; a force-transferring element having a tensioning element; an energy-absorbing element in the form of a deformation tube which is connected by a first end section to the base plate; and a connecting element for the disengageable connecting of the force-transferring element to a second end section of the deformation tube, wherein the connecting element is pressed against the tensioning element such that the deformation tube is braced between the tensioning element and the base plate without play.

Statutory Invention Registration No. H2,229, provides an apparatus for mitigating the effects of shock loading on occupants, cargo and gear the apparatus located in a watercraft the apparatus having a deck positioned and arranged in the watercraft for supporting thereon the occupants, cargo and gear, a hinge communicating with the deck and the watercraft and supporting the forwardly portion of the deck and permitting the deck to move and rotate about the hinge and prevent the deck from substantial side to side movement, a dampener communicating with the deck and hull of the watercraft the dampener positioned and arranged to move in response to the moving and rotating deck and the dampener absorbing at least a portion of the energy of the moving deck as the deck moves and rotates, and a spring communicating with the deck and the hull of the watercraft the spring positioned and arranged to support the rearwardly portion on the deck and to move in response to the moving and rotating deck the spring absorbing at least a portion of the energy of the moving and rotating deck and releasing the absorbed energy to raise the deck after the impacts.

U.S. Patent Application Publication No. 2010/0101404 A1 in the name of Lorenzo et al. describes a bi-active method of mounting a monolithic polycarbonate sheet or a laminate in a semi-rigid metallic framing system along two parallel sides of a rectangular shaped sheet or laminate with the two shorter parallel sides being unconstrained. In the case of a square shaped sheet, two parallel sides are supported in the semi-rigid frame, and the other two parallel sides are unconstrained. The semi-rigid frame utilizes cylindrically shaped hardware (i.e., bolts, rivets, studs, etc.) to hold the sheet or laminate. The semi-rigid frame is designed, via section and material properties, to flex and hinge about fixed mounting points along the length of the frame.

Pyles et al., in U.S. Patent Application Publication No. 2011/0048219 A1 disclose a blast-resistant barrier comprising a plurality of units each including a panel having a thickness of greater than 20 to less than 40 millimeter. The panel is in the form of a monolithic polycarbonate sheet or laminate that is positioned vertically between the source of a blast and the blast target, the laminate including at least two polycarbonate sheets and an optional image layer interposed therebetween. The panel is fixedly attached to a frame which is firmly embedded in concrete in a manner calculated to provide stiffness sufficient to absorb and withstand external forces resulting from said blast. In a preferred embodiment the panel includes at least two polycarbonate sheets laminated one to the other, optionally including an image layer interposed therebetween. In an additional embodiment, the frame is anchored securely to the target enabling dissipation of the blast force through the target's structure. The height of the blast-resistant barrier is preferably proportional to the height of the target.

U.S. Pat. No. 8,347,775 issued to Altenhof et al., provides an energy dissipation assembly for mounting between a fixed support and moveable support. The assembly includes a sacrificial deformation tube, a hardened cutter/deflector assembly and, optionally, a connecting cable to maintain the cutter/deflector assembly in juxtaposed coaxial alignment with an end deformation tube. The cutter/deflector assembly has a generally flattened disc shaped profile and includes a central hub, a circular support ring and one or more cutting blades. The support ring is concentrically about the hub and has an inner diameter greater than the outer tube diameter. On the occurrence of a shock force, the cutter/deflector assembly moves axial to cut/deform the deformation tube to dissipate force energy.

A need continues to exist in the art for improvements to blast barrier systems to provide increased blast resistance to further minimize damage to people and structures.

SUMMARY OF THE INVENTION

Accordingly, the present invention provides an energy absorber for a blast barrier system comprising a substantially tubular member extending longitudinally along an axis from a first end portion to a second end portion, each of the first end portion and the second end portion having a substantially similar geometric profile, wherein the energy absorber collapses under a predetermined load when compressed by a residual blast force. The energy absorber of the present invention may help minimize damage to people and structures by further dissipating force from a blast in a blast barrier system.

These and other advantages and benefits of the present invention will be apparent from the Detailed Description of the Invention herein below.

BRIEF DESCRIPTION OF THE FIGURES

The present invention will now be described for purposes of illustration and not limitation in conjunction with the figures, wherein.

Figure 9B:
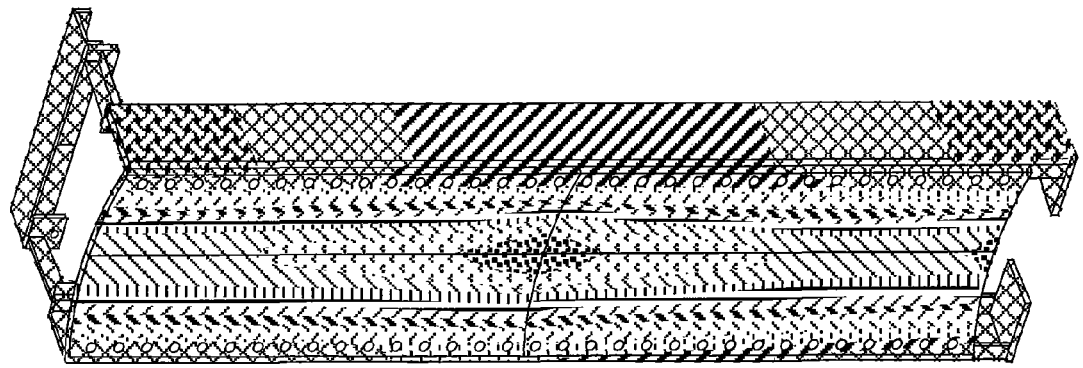
Figure 9B:
Figure 9A:
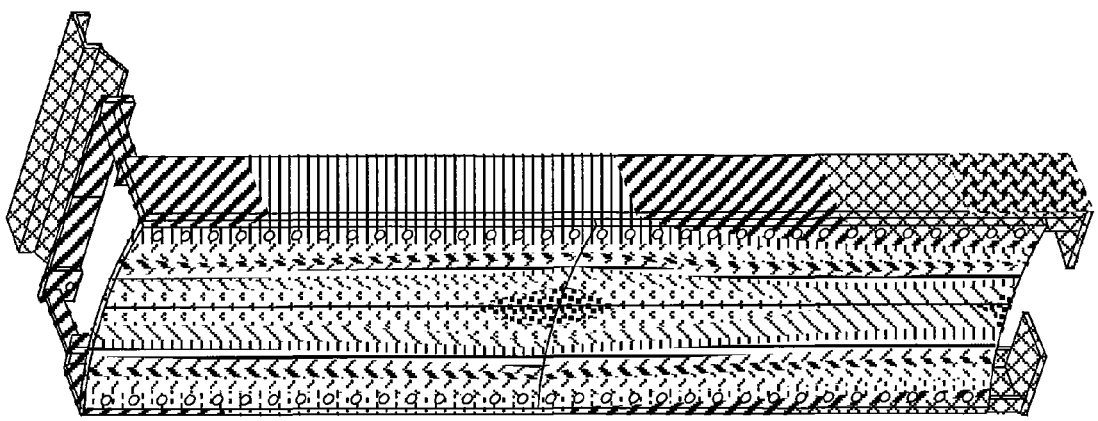
Figure 9A:
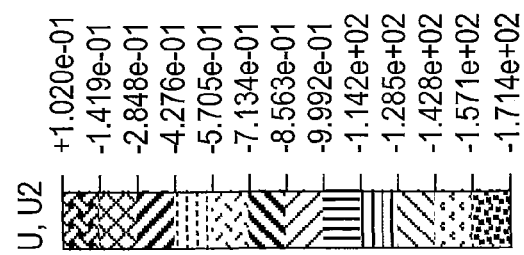
Figure 10:
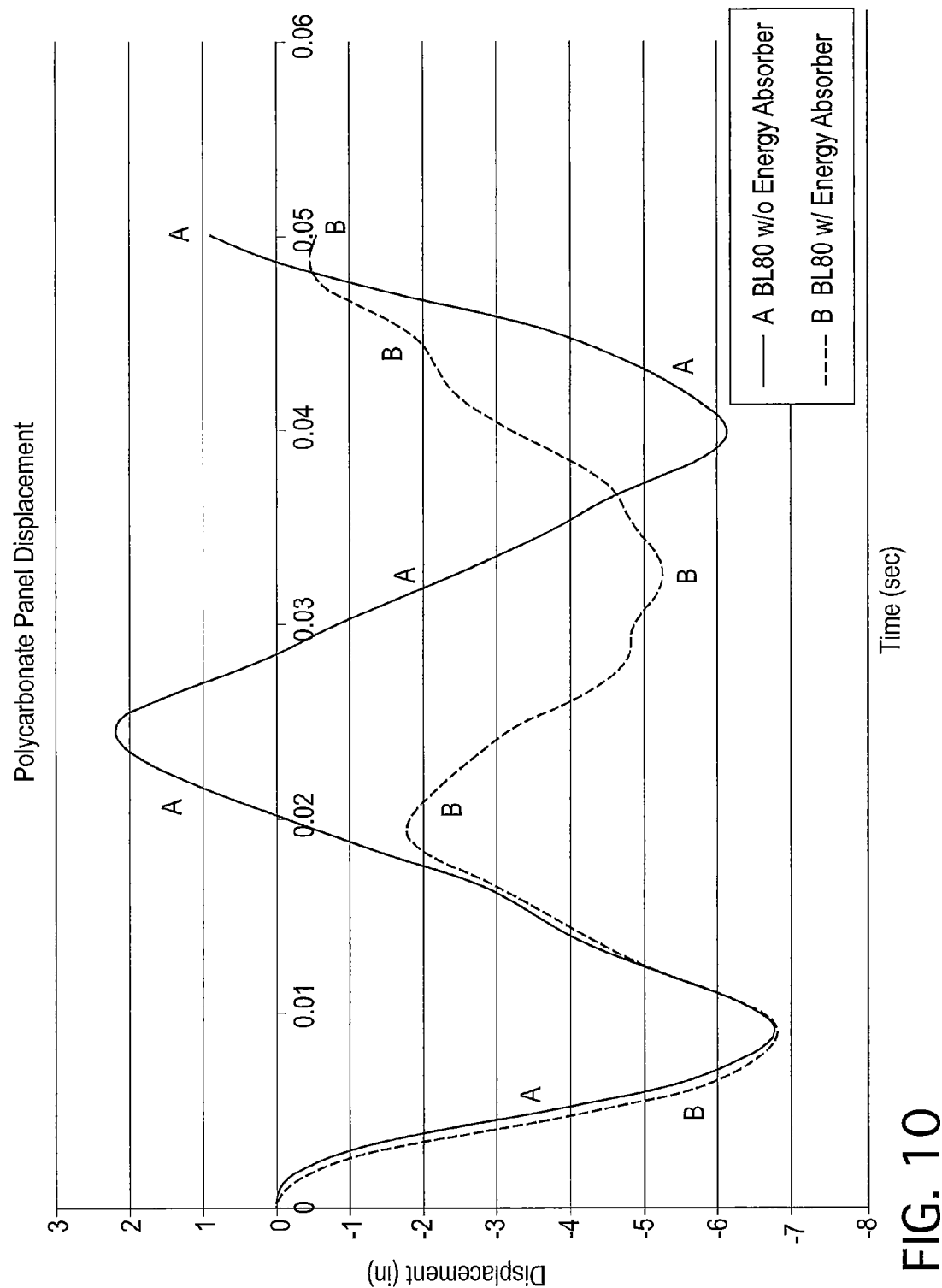
Figure 11:
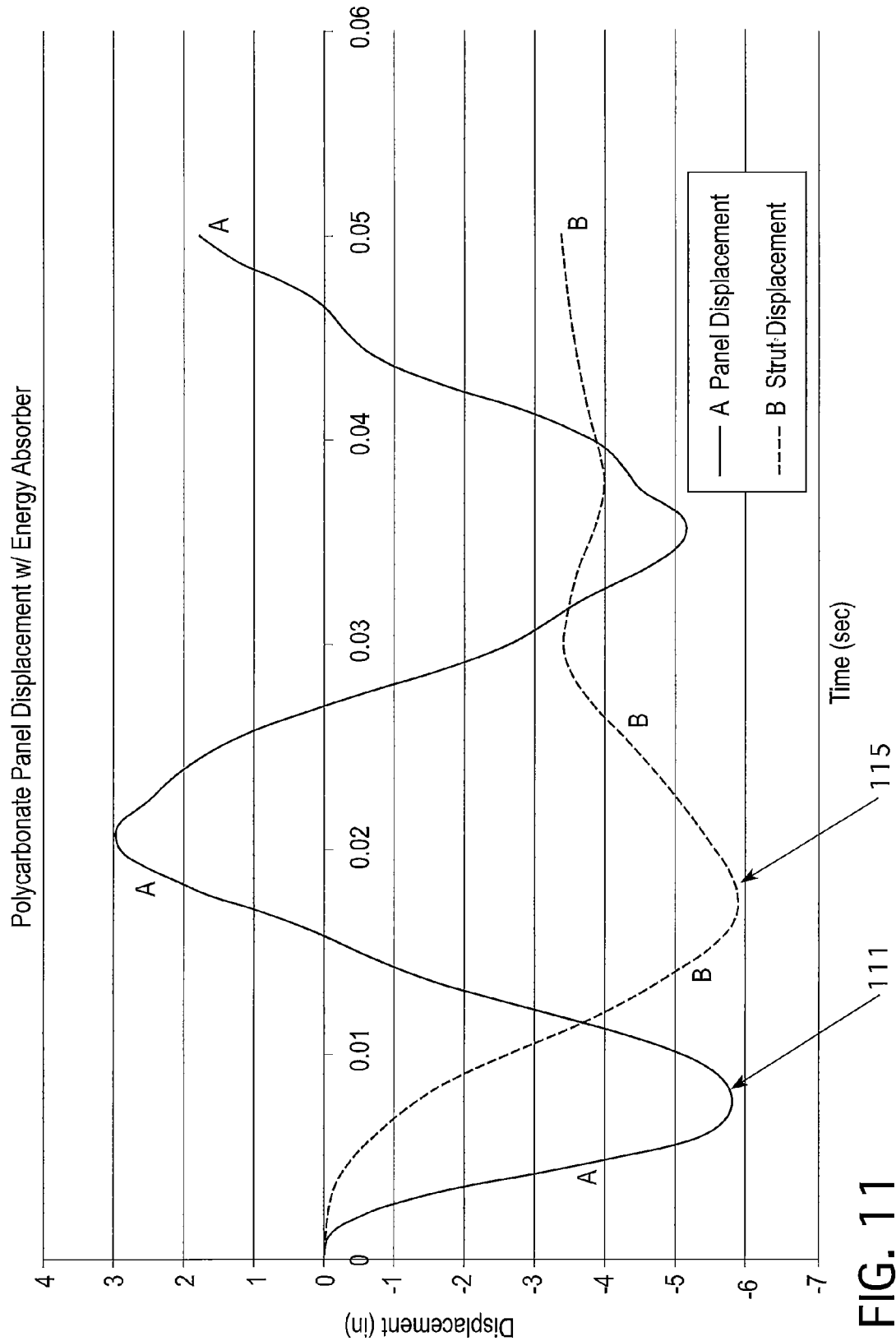
Figure 12:
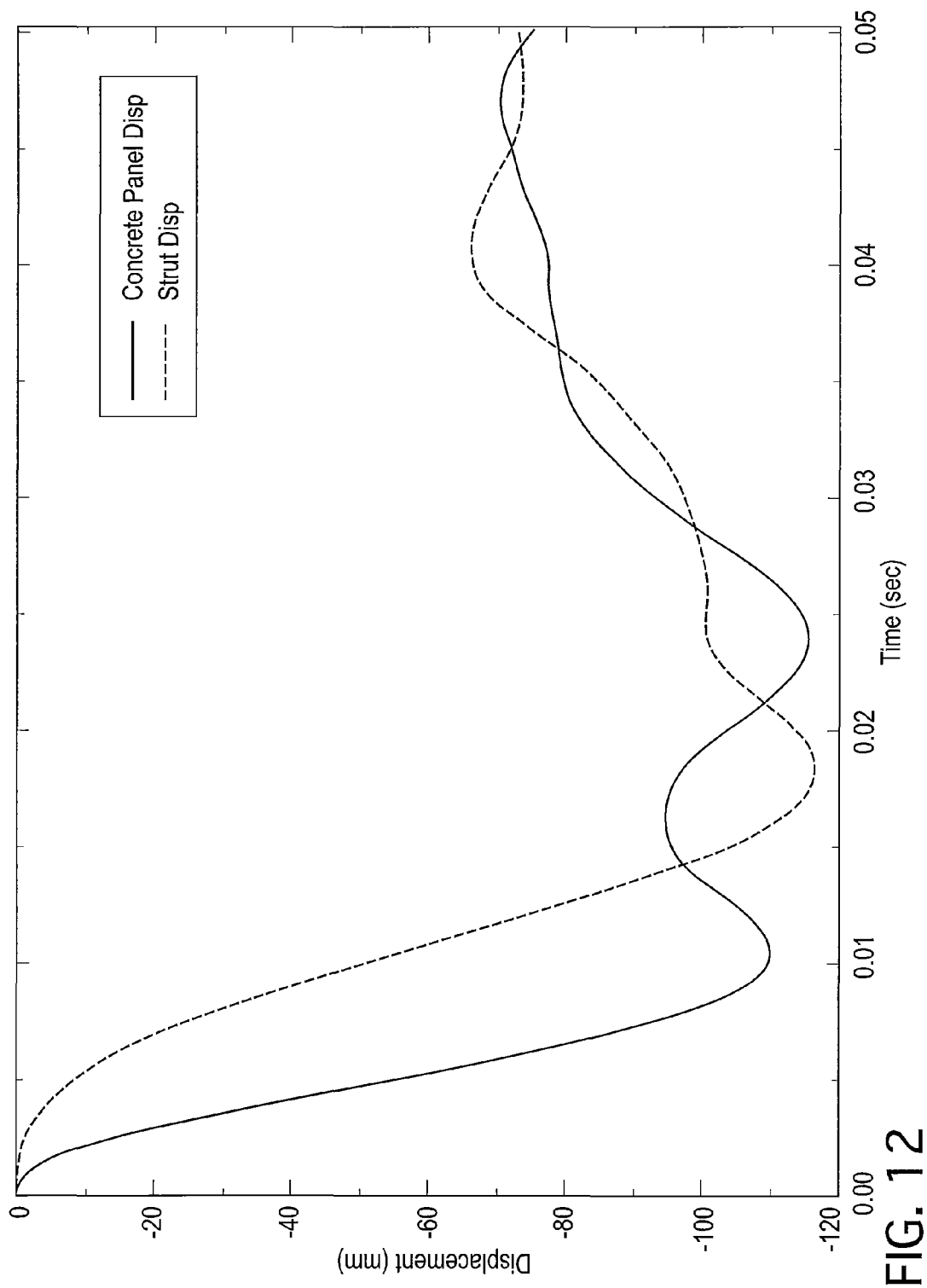

The inward displacement of a blast panel with the inventive energy absorber is shown in FIG. 9A;

FIG. 9B illustrates the inward displacement of a comparable panel without the inventive energy absorber;

FIG. 10 compares the displacement over time for the panels illustrated in FIGS. 9A and 9B;

FIG. 11 shows a comparison of the effectiveness of the inventive energy absorber in a blast barrier made of a polycarbonate sheet;

FIG. 12 shows a comparison of the displacement of a concrete panel and an attached strut.

Figure 13:
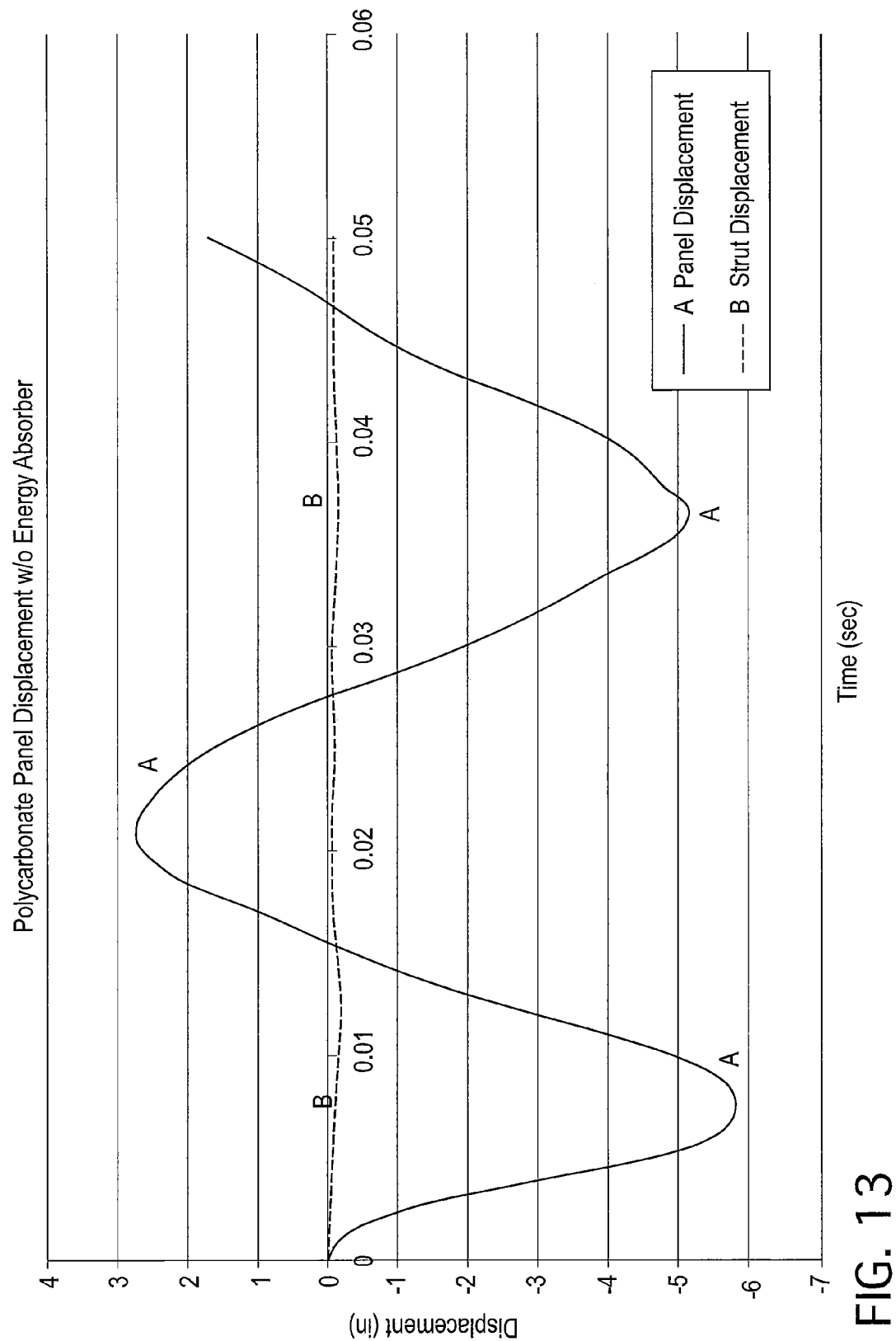

FIG. 13 shows no such displacement takes place in the blast barrier of FIG. 11 without the inventive energy absorber.

Figure 14:
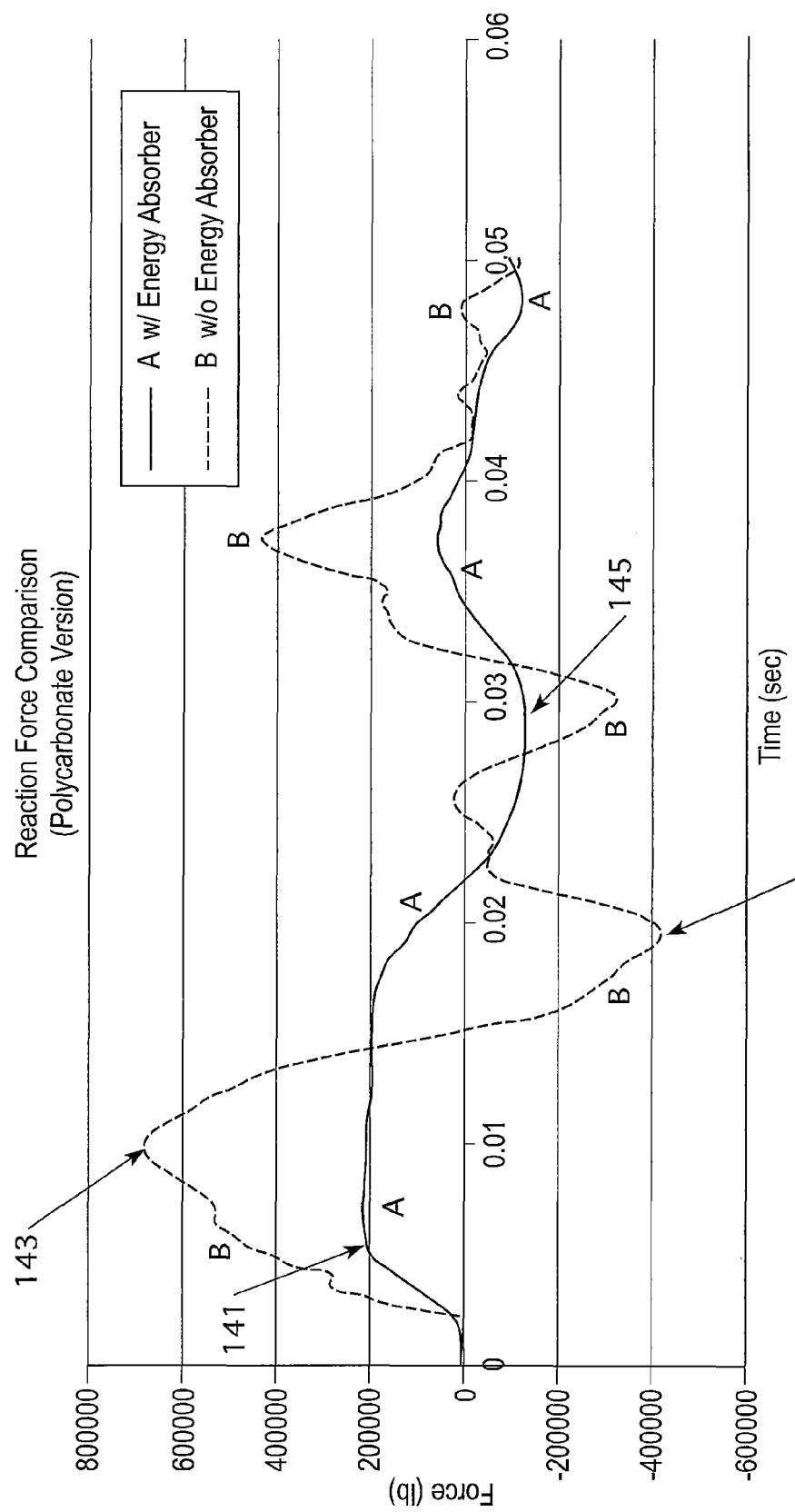
Figure 15A:
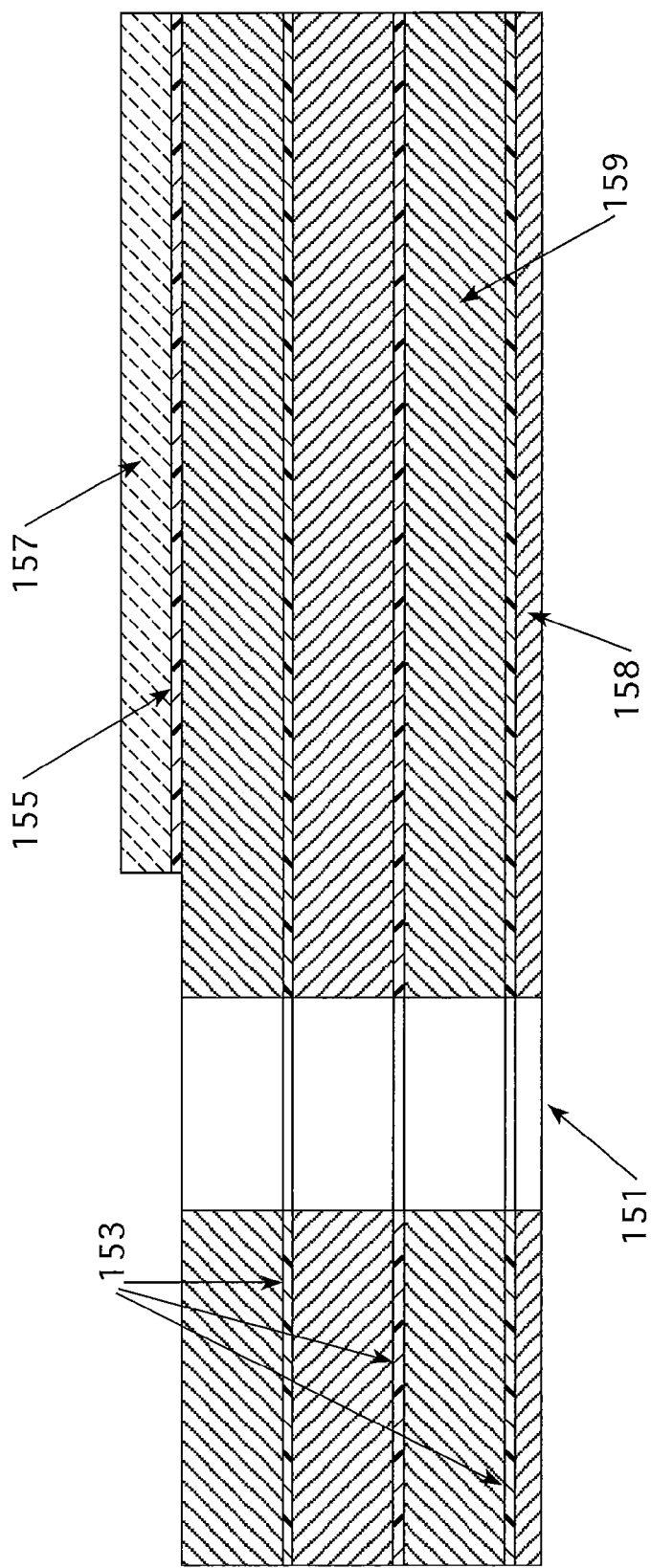
Figure 15C:
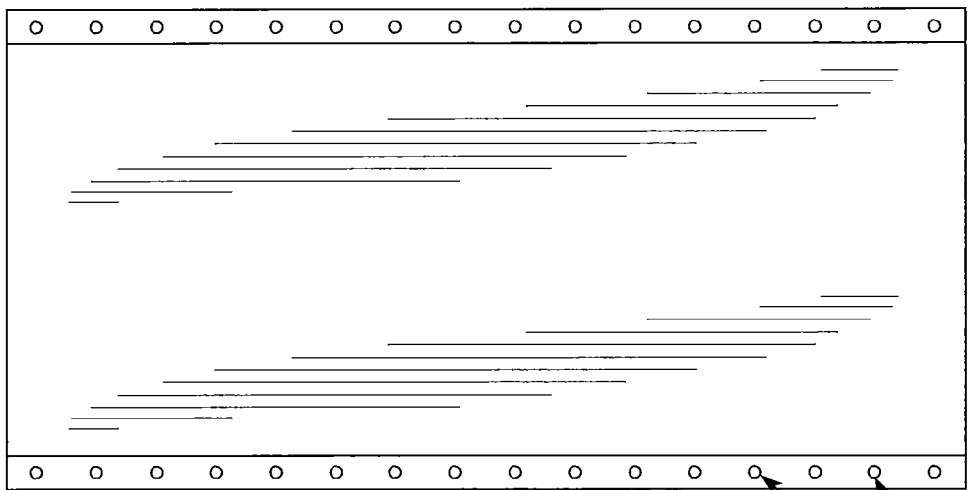
Figure 15B:
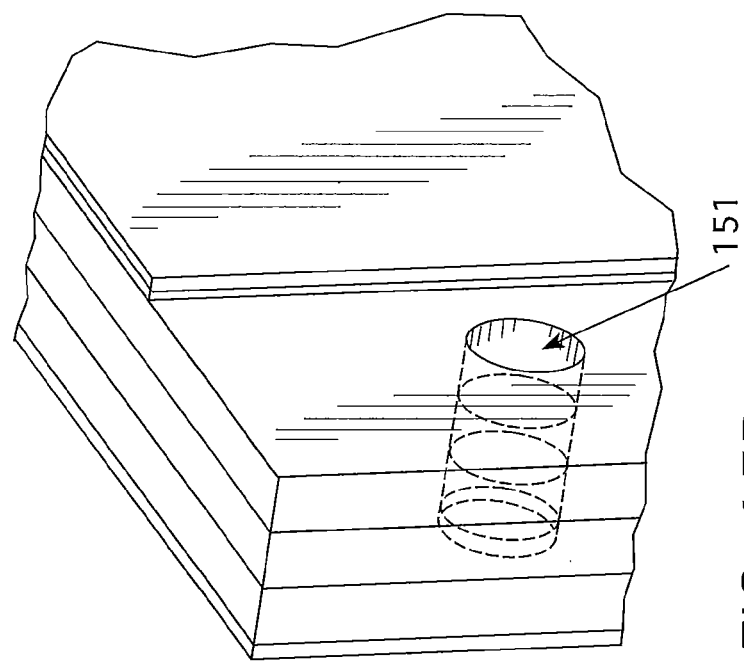
Figure 16:
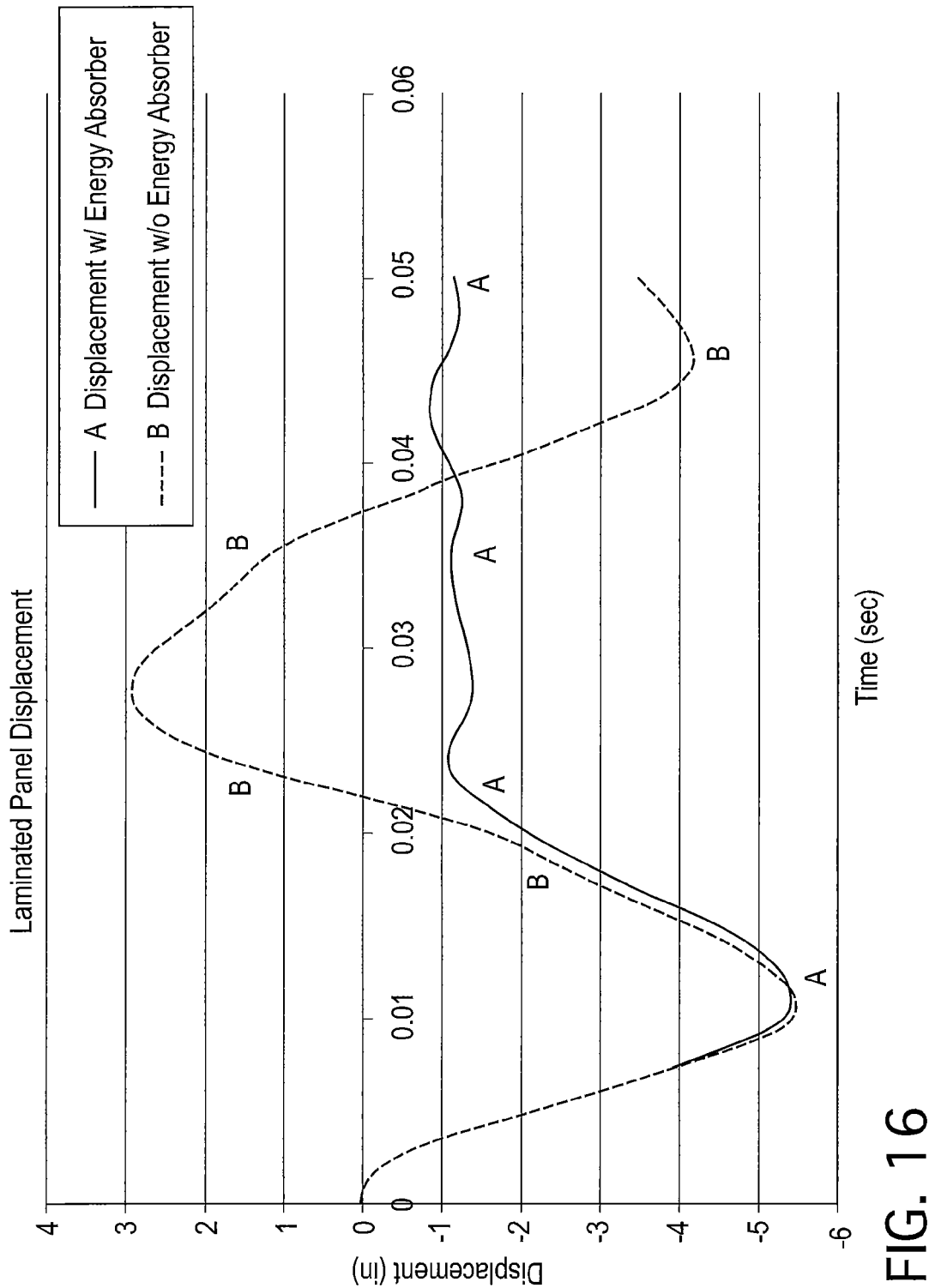
Figure 17:
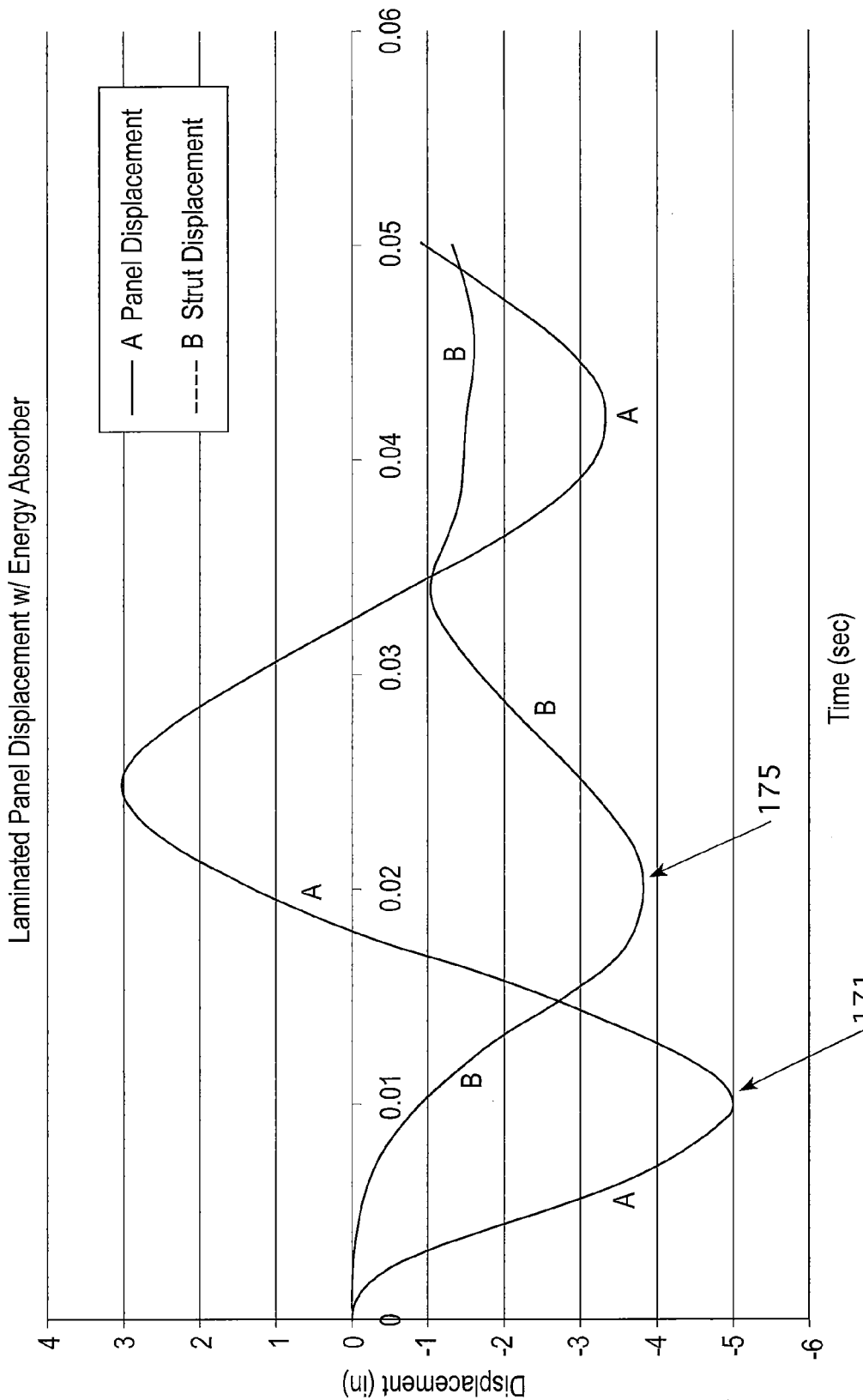
Figure 18:
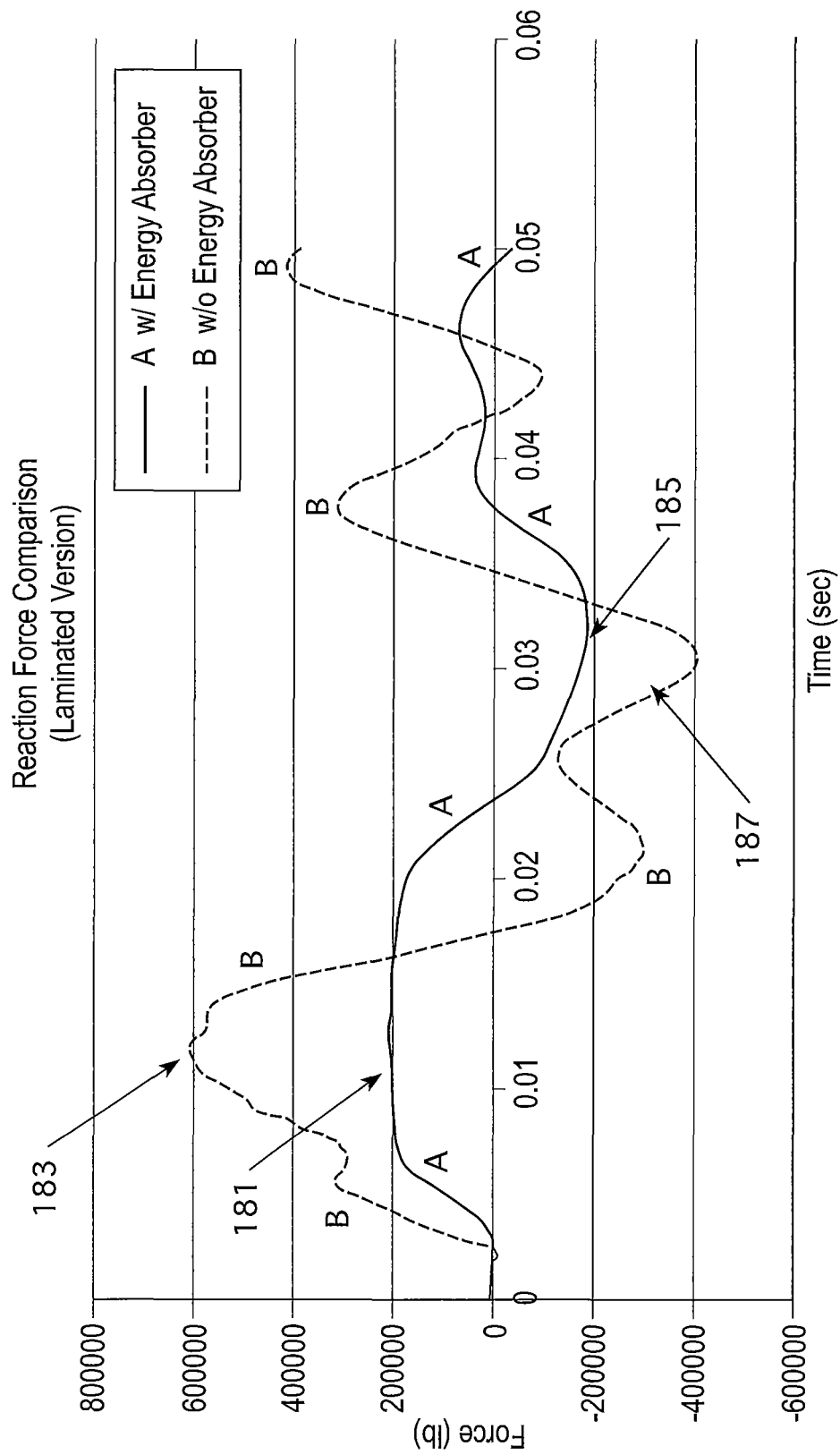

FIG. 14 is a graph showing the reaction force of a polycarbonate blast barrier with energy absorber;

FIG. 15A shows a cross-sectional view of a glass-clad polycarbonate blast barrier panel having notches or holes placed in the polycarbonate to avoid cracking the glass in the placement of bolts to connect the panel to a superstructure;

FIG. 15B provides a perspective view of the same panel;

FIG. 15C provides a view of the entire panel;

FIG. 16 is a graph showing displacement of a glass clad polycarbonate blast barrier panel with and without the inventive energy absorber;

FIG. 17 shows a comparison of the effectiveness of the inventive energy absorber in a glass clad polycarbonate blast barrier panel; and FIG. 18 is a graph showing the reaction force of a glass clad polycarbonate blast barrier panel with energy absorber.

DETAILED DESCRIPTION OF THE INVENTION

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about." Equivalent weights and molecular weights given herein in Daltons (Da) are number average equivalent weights and number average molecular weights respectively, unless indicated otherwise.

The present invention provides an energy absorber for a blast barrier system, the absorber comprising a substantially tubular member extending longitudinally along an axis from a first end portion to a second end portion, each of the first end portion and the second end portion having a substantially similar geometric profile, wherein the energy absorber collapses under a predetermined load when compressed by a residual blast force.

The present invention further provides a blast barrier system comprising a thermoplastic polymeric blast panel attached to a first face of a beam, a first end of a strut attached to a second face of the beam opposite the first face, a second end of the strut attached to an energy absorber comprising a substantially tubular member extending longitudinally along an axis from a first end portion to a second end portion, each of the first end portion and the second end portion having a substantially similar geometric profile, the energy absorber attached to a structure, wherein the energy absorber extends substantially longitudinally and horizontally along a face of the structure, wherein the blast panel flexes when compressed by a blast force and wherein the energy absorber collapses under a predetermined load when compressed by a residual blast force.

Polymeric panels are flexible and ductile, and hence polymeric panels will flex and dissipate some level of blast energy by flexing before a sufficient force is transferred to activate the collapse of energy absorbing units. The inventive energy absorber will respond to a force that has been dramatically reduced by the out-of-phase polymeric panel flexing. Moreover, to accommodate the polymeric panel flexing, a strut may preferably be used to provide standoff distance from the polymeric panel to the building wall. The strut is sufficient in length so the flexing panel will not contact and damage the building wall.

The polycarbonate sheets used in the blast barrier system may be transparent, translucent, or opaque. Moreover, the sheets may differ one from the others in their respective degrees of transparency or translucency and color.

Suitable polycarbonate resins for preparing the sheets useful in the laminates of the present invention are homopolycarbonates and copolycarbonates, both linear or branched resins and mixtures thereof.

The polycarbonates have a weight average molecular weight of preferably 10,000 to 200,000, more preferably 20,000 to 80,000 and their melt flow rate, per ASTM D-1238 at 300° C., is preferably 1 to 65 g/10 min., more preferably 2 to 35 g/10 min. They may be prepared, for example, by the known diphasic interface process from a carbonic acid derivative such as phosgene and dihydroxy compounds by polycondensation (See, German Offenlegungsschriften 2,063,050; 2,063,052; 1,570,703; 2,211,956; 2,211,957 and 2,248,817; French Patent 1,561,518; and the monograph by H. Schnell, "Chemistry and Physics of Polycarbonates", Interscience Publishers, New York, N.Y., 1964).

In the present context, dihydroxy compounds suitable for the preparation of the polycarbonates of the invention conform to the structural formulae (1) or (2) below.

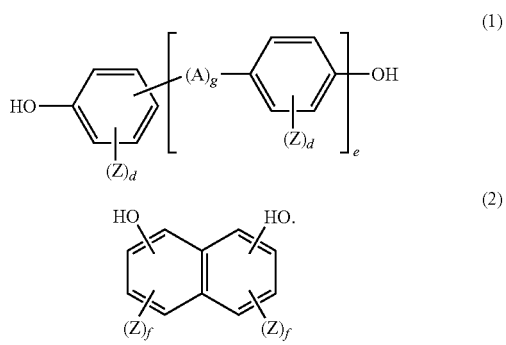

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$ or a radical conforming to (3)

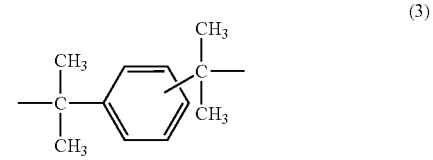

e and g both denote the number 0 to 1;

Z denotes F, Cl, Br or C$_1$-C$_4$-alkyl and if several Z radicals are substituents in one aryl radical, they may be identical or different from one another;

d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(13ydroxyl-phenyl)-ethers, bis-(hydroxyphenyl)-ketones, bis-(13ydroxyl-phenyl)-sulfoxides, bis-(hydroxyphenyl)-sulfides, bis-(hydroxyphenyl)-sulfones, and α,α-bis-(hydroxyphenyl)-diisopropylbenzenes, as well as their nuclear-alkylated compounds. These and further suitable aromatic dihydroxy compounds are described, for example, in U.S. Pat. Nos. 5,401,826; 5,105,004; 5,126,428; 5,109,076; 5,104,723; 5,086,157; 3,028,356; 2,999,835; 3,148,172; 2,991,273; 3,271,367; and 2,999,846, the contents of which are incorporated herein by reference.

Further examples of suitable bisphenols are 2,2-bis-(4-hydroxyphenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxy-phenyl)-p-diisopropylbenzene, 2,2-bis-(3-methyl-4-hydroxyphenyl)-propane, 2,2-bis-(3-chloro-4-hydroxyphenyl)-propane, 4,4'-dihydroxy-diphenyl, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxy-phenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane, α,α'-bis-(3,5-dimethyl-4-hydroxyphenyl)-p-diisopropyl-benzene and 4,4'-sulfonyl diphenol.

Examples of particularly preferred aromatic bisphenols are 2,2-bis-(4-hydroxyphenyl)-propane, 2,2-bis-(3,5-dimethyl-4-hydroxyphenyl)-propane, 1,1-bis-(4-hydroxyphenyl)-cyclohexane and 1,1-bis-(4-hydroxy-phenyl)-3,3,5-trimethylcyclohexane. The most preferred bisphenol is 2,2-bis-(4-hydroxyphenyl)-propane (bisphenol A).

The polycarbonates useful in producing the sheets for the laminates of the invention may entail in their structure units derived from one or more of the suitable bisphenols.

Among the resins suitable in the practice of the invention are phenolphthalein-based polycarbonate, copolycarbonates and terpolycarbonates such as are described in U.S. Pat. Nos. 3,036,036 and 4,210,741, both of which are incorporated by reference herein.

The polycarbonates useful in preparing the sheets laminates of the invention may also be branched by condensing therein small quantities, e.g., 0.05 to 2.0 mol % (relative to the bisphenols) of polyhydroxyl compounds. Polycarbonates of this type have been described, for example, in German Offenlegungsschriften 1,570,533; 2,116,974 and 2,113,374; British Patents 885,442 and 1,079,821 and U.S. Pat. No. 3,544,514, which is incorporated herein by reference. The following are some examples of polyhydroxyl compounds which may be used for this purpose: phloroglucinol; 4,6-dimethyl-2,4,6-tri-(4-hydroxy-phenyl)-heptane; 1,3,5-tri-(4-hydroxyphenyl)-benzene; 1,1,1-tri-(4-hydroxyphenyl)-ethane; tri-(4-hydroxyphenyl)-phenyl-methane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methyl-phenol; 2,4-dihydroxybenzoic acid; 2-(4-hydroxy-phenyl)-2-(2,4-dihydroxy-phenyl)-propane and 1,4-bis-(4,4'-dihydroxytri-phenylmethyl)-benzene. Some of the other polyfunctional compounds are 2,4-dihydroxy-benzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in U.S. Pat. Nos. 3,028,365; 2,999,846; 3,153,008; and 2,991,273 which are incorporated herein by reference.

The preferred process for the preparation of polycarbonates is the interfacial polycondensation process. Other methods of synthesis in forming the polycarbonates of the invention, such as disclosed in U.S. Pat. No. 3,912,688, incorporated herein by reference, may be used. Suitable polycarbonate resins are available in commerce, for instance, from Bayer MaterialScience under the MAKROLON trademark. The polycarbonate is preferably used in the form of sheets or films in the inventive laminates. Suitable polycarbonate sheets are available under the HYGARD trademark.

Aliphatic thermoplastic polyurethanes are particularly preferred in the laminate of the present invention such as those prepared according to U.S. Pat. No. 6,518,389, the entire contents of which are incorporated herein by reference.

Thermoplastic polyurethane elastomers are well known to those skilled in the art. They are of commercial importance due to their combination of high-grade mechanical properties with the known advantages of cost-effective thermoplastic processability. A wide range of variation in their mechanical properties can be achieved by the use of different chemical synthesis components. A review of thermoplastic polyurethanes, their properties and applications is given in Kunststoffe [*Plastics*] 68 (1978), pages 819 to 825, and in Kautschuk, Gummi, *Kunststoffe* [Natural and Vulcanized Rubber and Plastics] 35 (1982), pages 568 to 584.

Thermoplastic polyurethanes are synthesized from linear polyols, mainly polyester diols or polyether diols, organic diisocyanates and short chain diols (chain extenders). Catalysts may be added to the reaction to speed up the reaction of the components.

The relative amounts of the components may be varied over a wide range of molar ratios in order to adjust the properties. Molar ratios of polyols to chain extenders from 1:1 to 1:12 have been reported. These result in products with hardness values ranging from 80 Shore A to 75 Shore D.

Thermoplastic polyurethanes can be produced either in stages (prepolymer method) or by the simultaneous reaction of all the components in one step (one shot). In the former, a prepolymer formed from the polyol and diisocyanate is first formed and then reacted with the chain extender. Thermoplastic polyurethanes may be produced continuously or batch-wise. The best-known industrial production processes are the so-called belt process and the extruder process.

Examples of the suitable polyols include difunctional polyether polyols, polyester polyols, and polycarbonate polyols. Small amounts of trifunctional polyols may be used, yet care must be taken to make certain that the thermoplasticity of the thermoplastic polyurethane remains substantially un-effected.

Suitable polyester polyols include those which are prepared by polymerizing ε-caprolactone using an initiator such as ethylene glycol, ethanolamine and the like. Further suitable examples are those prepared by esterification of polycarboxylic acids. The polycarboxylic acids may be aliphatic, cycloaliphatic, aromatic and/or heterocyclic and they may be substituted, e.g., by halogen atoms, and/or unsaturated. The following are mentioned as examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include, e.g., ethylene glycol; propylene glycol-(1,2) and -(1,3); butylene glycol-(1,4) and -(1,3); hexanediol-(1,6); octanediol-(1,8); neopentyl glycol; (1,4-bis-hydroxy-methylcyclohexane); 2-methyl-1,3-propanediol; 2,2,4-tri-methyl-1,3-pentanediol; triethylene glycol; tetraethylene glycol; polyethylene glycol; dipropylene glycol; polypropylene glycol; dibutylene glycol and polybutylene glycol, glycerine and trimethylolpropane.

Suitable polyisocyanates for producing the thermoplastic polyurethanes useful in the laminates of the present invention may be, for example, organic aliphatic diisocyanates including, for example, 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)-methane, 2,4'-dicyclohexylmethane diisocyanate, 1,3- and 1,4-bis-(isocyanatomethyl)-cyclohexane, bis-(4-isocyanato-3-methylcyclohexyl)-methane, α,α,α',α'-tetramethyl-1,3- and/or -1,4-xylylene diisocyanate, 1-isocyanato-1-methyl-4 (3)-isocyanatomethyl cyclohexane, 2,4- and/or 2,6-hexahydrotoluylene diisocyanate, and mixtures thereof.

Preferred chain extenders with molecular weights of 62 to 500 include aliphatic diols containing 2 to 14 carbon atoms, such as ethanediol, 1,6-hexanediol, diethylene glycol, dipropylene glycol, and 1,4-butanediol in particular, for example. However, diesters of terephthalic acid with glycols containing 2 to 4 carbon atoms are also suitable, such as terephthalic acid-bis-ethylene glycol or -1,4-butanediol for example, or hydroxyalkyl ethers of hydroquinone, such as 1,4-di-(β-hydroxyethyl)-hydroquinone for example, or (cyclo)aliphatic diamines, such as isophorone diamine, 1,2- and 1,3-propylenediamine, N-methyl-propylenediamine-1,3 or N,N'-dimethyl-ethylenediamine, for example, and aromatic diamines, such as toluene 2,4- and 2,6-diamines, 3,5-diethyltoluene 2,4- and/or 2,6-diamine, and primary ortho-, di-, tri- and/or tetraalkyl-substituted 4,4'-diaminodiphenylmethanes, for example. Mixtures of the aforementioned chain extenders may also be used. Optionally, triol chain extenders having a molecular weight of 62 to 500 may also be used. Moreover, customary monofunctional compounds may also be used in small amounts, e.g., as chain terminators or demolding agents. Alcohols such as octanol and stearyl alcohol or amines such as butylamine and stearylamine may be cited as examples.

To prepare the thermoplastic polyurethanes, the synthesis components may be reacted, optionally in the presence of catalysts, auxiliary agents and/or additives, in amounts such that the equivalent ratio of NCO groups to the sum of the groups which react with NCO, particularly the OH groups of the low molecular weight diols/triols and polyols, is 0.9:1.0 to 1.2:1.0, preferably 0.95:1.0 to 1.10:1.0.

Suitable catalysts include tertiary amines which are known in the art, such as triethylamine, dimethyl-cyclohexylamine, N-methylmorpholine, N,N'-dimethyl-piperazine, 2-(dimethyl-aminoethoxy)-ethanol, diazabicyclo-(2,2,2)-octane and the like, for example, as well as organic metal compounds in particular, such as titanic acid esters, iron compounds, tin compounds, e.g., tin diacetate, tin dioctoate, tin dilaurate or the dialkyltin salts of aliphatic carboxylic acids such as dibutyltin diacetate, dibutyltin dilaurate or the like. The preferred catalysts are organic metal compounds, particularly titanic acid esters and iron and/or tin compounds.

In addition to difunctional chain extenders, small quantities of up to about 5 mol. Percent, based on moles of the bifunctional chain extender used, of trifunctional or more than trifunctional chain extenders may also be used.

Trifunctional or more than trifunctional chain extenders of the type in question are, for example, glycerol, trimethylolpropane, hexanetriol, pentaerythritol and triethanolamine.

The thickness of the laminate of the present invention is preferably 0.5 inches (1.3 cm) to 3 inches (7.6 cm), more preferably 0.8 inches (2.1 cm) to 2 inches (5.1 cm). The thickness of the laminate of the present invention may be in an amount ranging between any combination of these values, inclusive of the recited values. Optionally, the inventive laminate may be placed at a standoff of 15 feet (4.6 m) to 1 feet (0.31 m), more preferably 7 feet (2.2 m) to 3 feet (0.92 m) from the object (such as a building or other structure) to be protected to introduce an "air gap" between the laminate and the structure and thereby provide additional protection against the blast or ballistic event. The standoff distance of the inventive laminate from the object to be protected may be in an amount ranging between any combination of these values, inclusive of the recited values.

Although the laminate of the present invention in the present disclosure is illustrated as a three polycarbonate/one glass layer material adhered together with thermoplastic polyurethanes, those skilled in the art will recognize that any number and combination of layers is possible depending upon the level of protection desired. The glass layers may be any number of glass types, including: annealed glass; thermally treated toughened glass; laminated glass; coated glass; mirrored glass using metals such as silver, aluminum, gold or chrome; extra clear glass made with low iron content; and patterned and colored glass. For blast-resisting applications, thermally treated toughened glass is preferred, and for ballistics glass, there is a preference for thermally treated toughened and laminated glass.

This invention is preferably deployed as part of the steel skeletal structure during the installation of an impact shield. The invention will help to mitigate blast forces by reducing and distributing residual blast pressures more evenly to building floors in the event of a vehicular bombing attack on a building so equipped. Additionally, this invention may act as passive blast pressure sensors to help determine the size and location of the bomb during the forensic investigation in the aftermath of such a bombing. The polymeric panels are connected to the skeletal structure by one or more of the inventive energy absorbers.

EXAMPLES

The present invention is further illustrated, but is not to be limited, by the following examples.

The inventive energy absorber operates in the following manner: when a vehicular bomb is detonated, a strong force is created that rapidly expands from the center of the explosion in a radial direction. This force will impinge on the polymeric panel of a blast bather of a protected building. In response to the impinging force, the blast barrier will flex and dissipate some of the force by converting the force to mechanic energy through flexing. The blast force is further dissipated by the inventive energy absorber, which is designed to collapse under a predetermined load when compressed by the residual blast force. The polymeric panel and energy absorber response times are preferably off-set by 0.002-0.003 seconds (see FIG. 8).

The energy absorber may be any length needed to dissipate the residual energy effectively and evenly into building floors. The energy absorber may assume any geometric form, but the present inventors have found the energy absorber most efficiently dissipates energy if deployed in a hexagonal shaped tube-like form. The inventive energy absorber may preferably be filled with an energy-absorbing foam or a collapsible metal insert. This insert may be produced from a malleable metal such as copper, aluminum or steel, and installed in the energy absorber cavity. The insert metal may be protectively coated to avoid an electrolytic and corrosive reaction between any dissimilar metals.

The inventive energy absorber may be made of any metal or polymer, preferably the energy absorber is made of steel, or aluminum or aluminum alloys.

Figure 1:
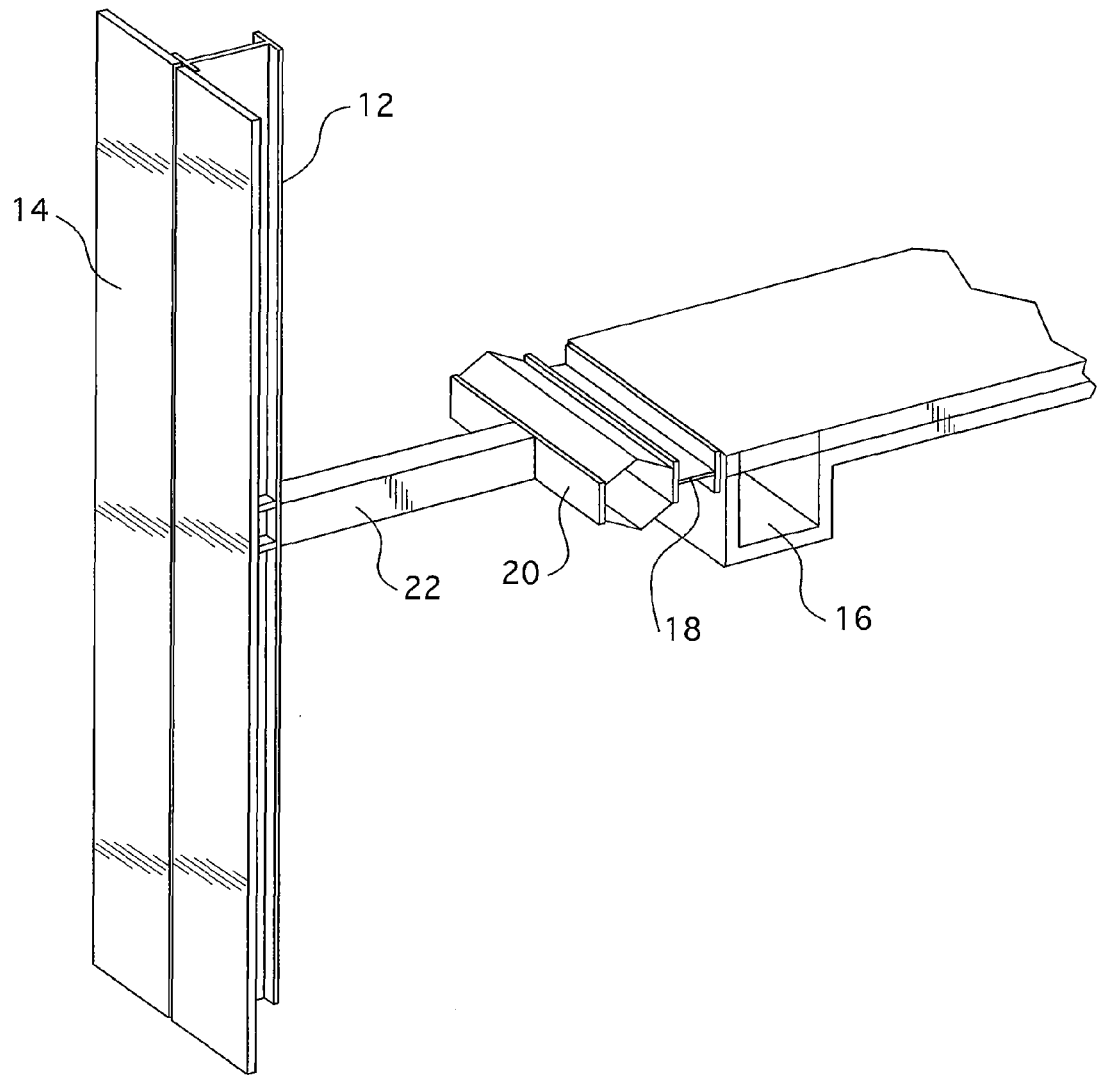
FIG. 1, provides one embodiment of the energy absorber of present invention in a blast barrier system.

As shown in FIG. 1, in one embodiment of the present invention, a blast barrier may comprise a column 12, preferably steel, which has attached thereto a polycarbonate panel 14. A strut 22, preferably steel, is attached to the opposite side of the column 12 and at its other end, the strut 22 contacts hexagonal profile energy absorber 20, preferably steel, which contacts spreader beam 18 attached to the existing. These attachments may be made by any method known in the art, with preference being given to bolting or welding the materials together.

Figures 2, 3:
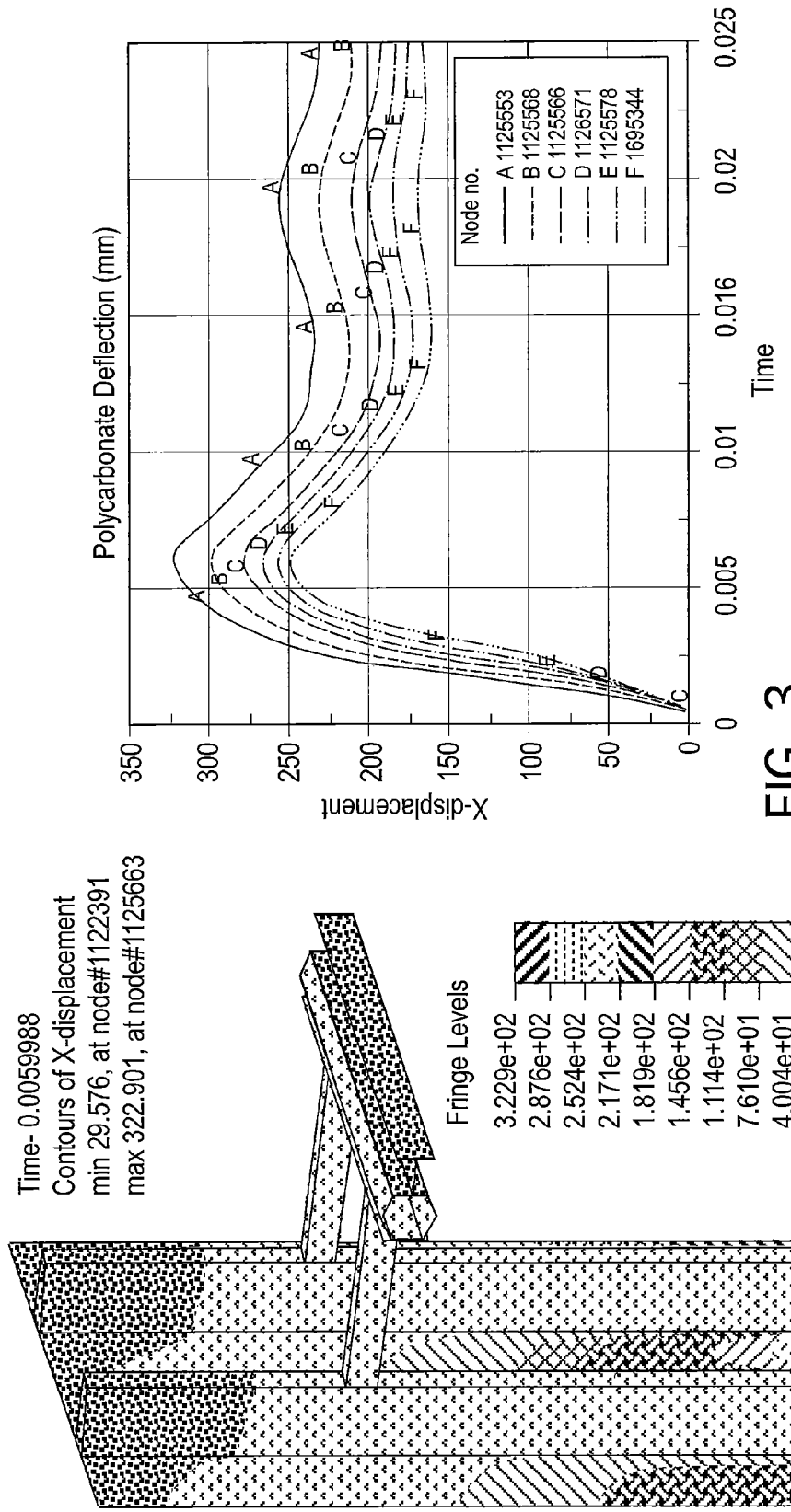
FIG. 2 shows the Finite Element Analysis model used to determine the displacement of a polycarbonate panel of a blast barrier system including the inventive energy absorber.
FIG. 3 is a graph showing the deflection over time of the polycarbonate panel depicted in FIG. 2.

FIG. 2 shows the Finite Element Analysis model used to determine the displacement of a polycarbonate panel of a blast barrier system including the inventive energy absorber. FIG. 3 is a graph showing the deflection over time of the polycarbonate panel depicted in FIG. 2. As can be appreciated by reference to FIG. 3, the polycarbonate panel deflected and the peak deflection was observed at 0.006 seconds.

Figures 4, 5:
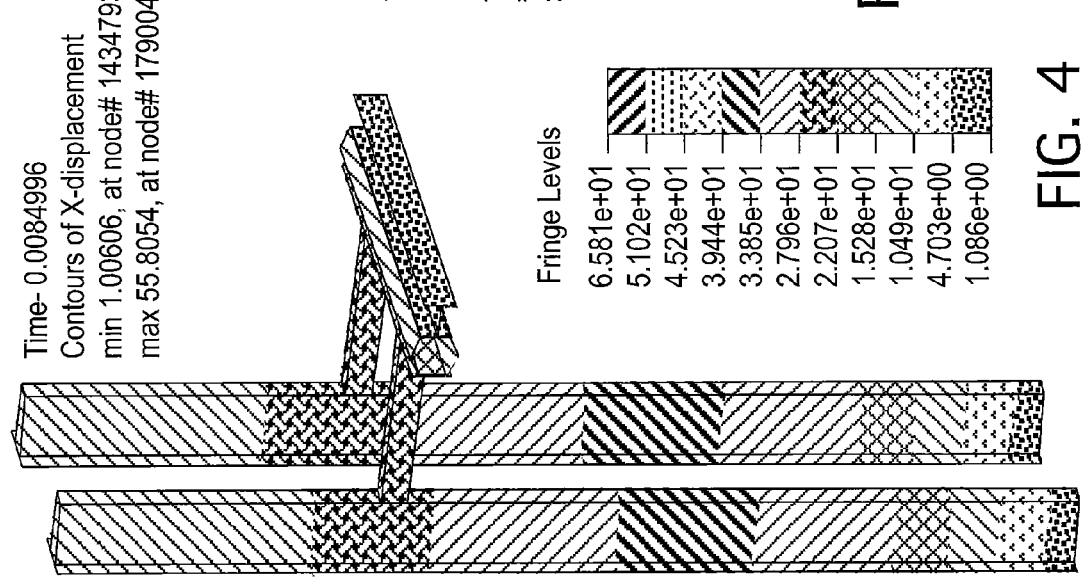
FIG. 4 shows the Finite Element Analysis model used to determine the column displacement of a blast barrier system including the inventive energy absorber.
FIG. 5 is a graph showing the deflection over time of the column depicted in FIG. 4.

FIG. 4 shows the Finite Element Analysis model used to determine the column displacement of a blast barrier system including the inventive energy absorber. FIG. 5 is a graph showing the deflection over time of the column depicted in FIG. 4. As can be appreciated by reference to FIG. 5, the column deflected and the peak deflection occurred at 0.008 seconds.

Figure 6:
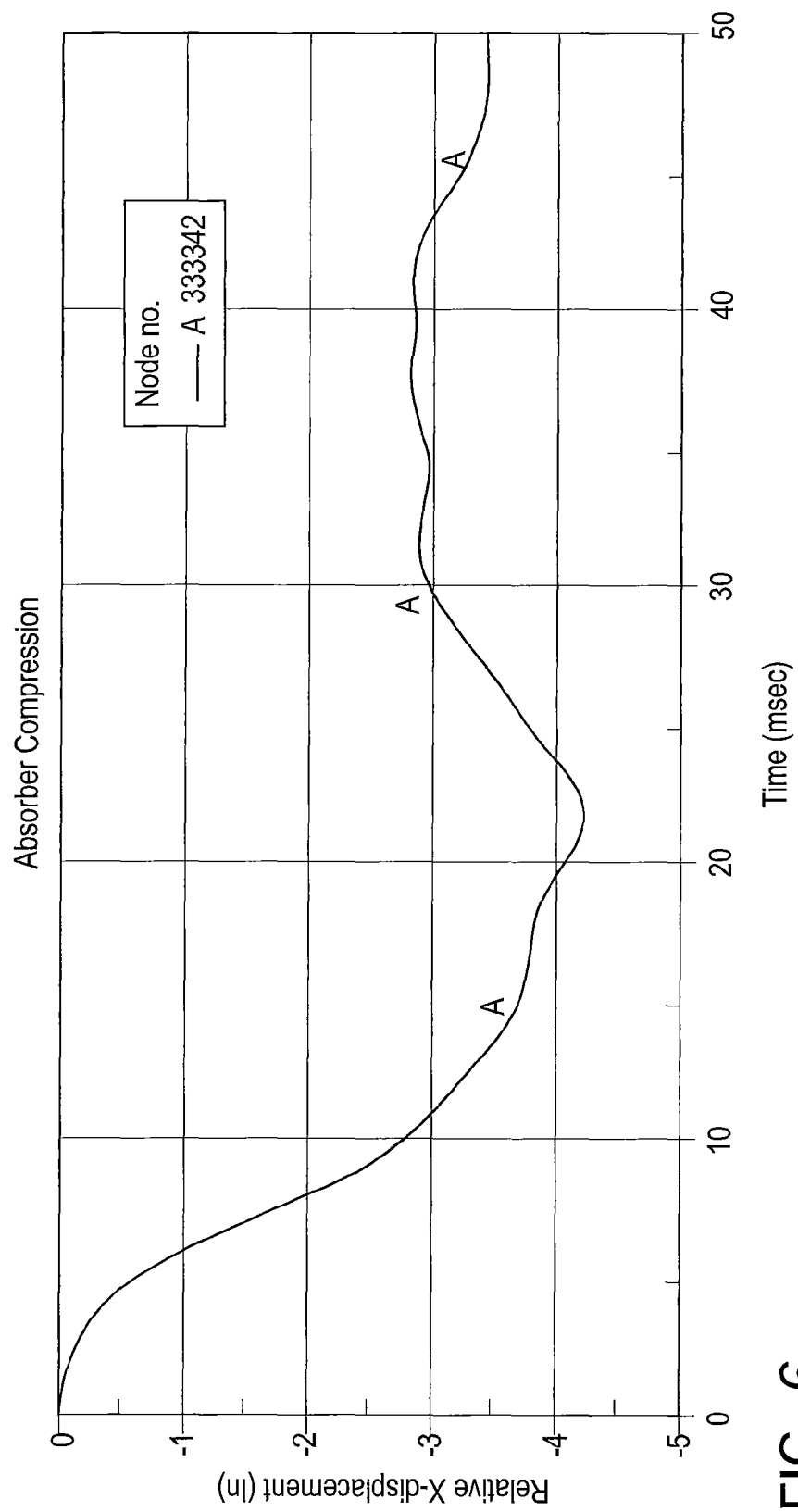
FIG. 6 is a graph showing the deformation time history of a Finite Element Analysis model of the inventive energy absorber.

FIG. 6 is a graph showing the deformation time history of a Finite Element Analysis model of the inventive energy absorber. As can be appreciated by reference to FIG. 6, the energy absorber lost most of its resistance to the applied blast force at 0.010 seconds.

Figure 7:
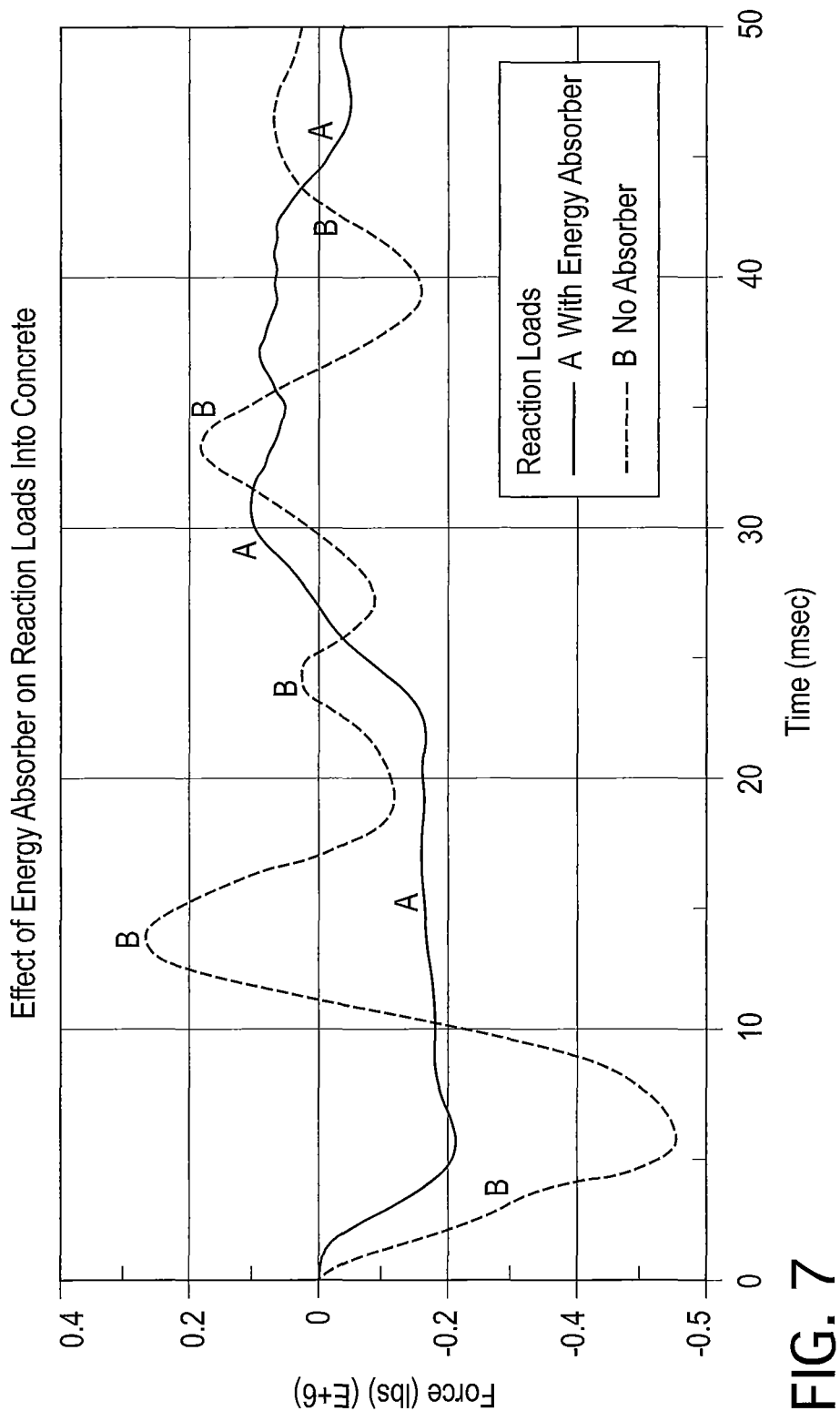
FIG. 7 is a graph showing a Finite Element Analysis model of the lateral load reaction time history with and without the inventive energy absorber.

FIG. 7 is a graph showing a Finite Element Analysis model of the lateral load reaction time history with and without the inventive energy absorber. As can be appreciated by reference to FIG. 7, without the inventive energy absorber installed, applied blast forces transferred into the building are much more volatile. This volatility has the potential to cause significant damage to the building. In contrast, the energy absorber of the present invention manages this applied force volatility of energy reaching the building. Thus, significant damage to the building can be avoided.

Two panel types were analyzed under an explosion equivalent to 2000 lbs. (907 kg) of TNT at a distance of 80 feet (24.4 m): (a) polycarbonate panels (HYGARD BL80 from Bayer MaterialScience); and (b) laminated polycarbonate panels (glass-clad HYGARD BL80 from Bayer MaterialScience).

Two systems were analyzed for each panel type: (1) a system including two 4'×8' (1.22 m×2.44 m) blast panels with a steel energy absorber; and (2) a system including two 4'×8' (1.22 m×2.44 m) blast panels without an energy absorber. In addition, two lightweight systems for each panel type (less one polycarbonate layer of ½ inch (127 mm)) were analyzed.

Figure 8A:
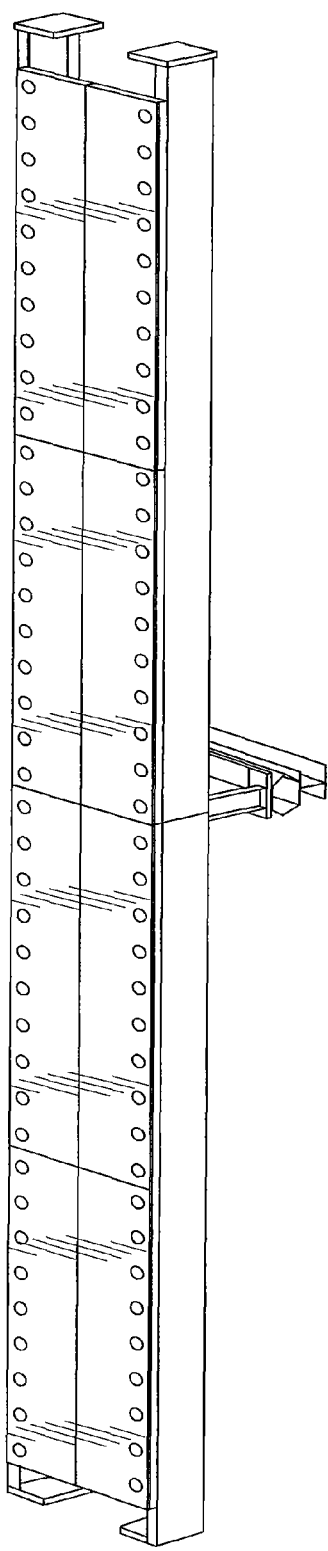
FIG. 8A illustrates a full model including the inventive energy absorber.
Figure 8B:
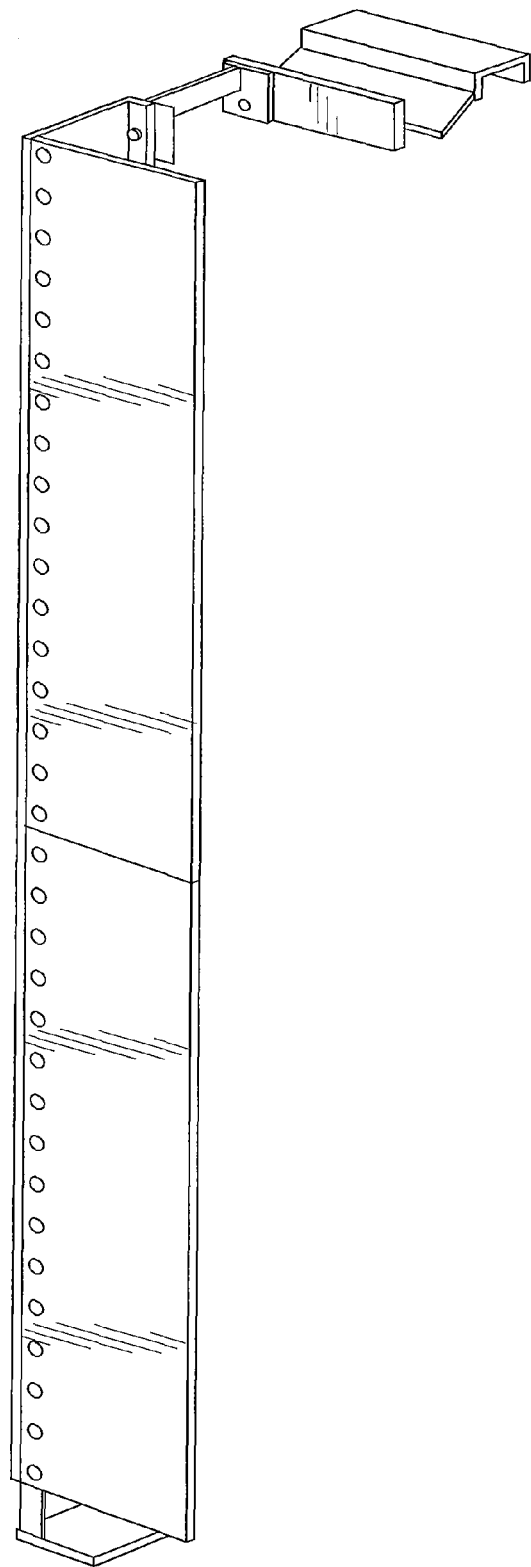
FIG. 8B depicts a quarter symmetry model with energy absorber of the present invention.

Each situation was solved using the Finite Element Analysis program ABAQUS/EXPLICIT. Analyses were performed on quarter-symmetry models. FIG. 8A illustrates a full model including the inventive energy absorber and FIG. 8B depicts a quarter symmetry model with energy absorber of the present invention.

The inward displacement of a blast panel with the inventive energy absorber is shown in FIG. 9A whereas FIG. 9B illustrates the inward displacement of a comparable panel without the inventive energy absorber. The maximum inward panel displacement measured at the center of the panel with energy absorber (shown in FIG. 9A) was 6.79 in. (172.38 mm) and the maximum inward panel displacement, again measured at the center of the panel, without energy absorber (shown in FIG. 9B) was 6.75 in. (171.49 mm). FIG. 10 compares the displacement over time for the panels illustrated in FIGS. 9A and 9B. Although the maximum displacements of the panels are comparable, occurring as initial blast energy impacts both panels, the panel fitted with the inventive energy absorber showed a significant reduction in panel displacement (reaction forces) thereafter.

FIG. 11 shows a comparison of the effectiveness of the inventive energy absorber in a blast barrier made of a polycarbonate sheet. As can be appreciated by reference to FIG. 11, as shown at points indicated by 111 and 115, the inventive energy absorber provided an "out-of-phase" displacement of the panel and the strut to reduce reaction force.

FIG. 12 shows a comparison of the displacement of a concrete panel and an attached strut. As can be appreciated by reference to FIG. 12, the panel and the strut move in similar manner to each other, unlike the "out-of-phase" displacement seen in FIG. 11 for the polycarbonate blast barrier with inventive energy absorber. Thus, the concrete panel does not provide a reduced reaction force.

Also, as shown in FIG. 13, no displacement takes place in the same blast barrier as in FIG. 11, without the inventive energy absorber being present.

FIG. 14 is a graph showing the reaction force of a polycarbonate blast barrier with energy absorber. As can be appreciated by reference to FIG. 14, the inventive energy absorber provided >60% reduction in lateral inward force applied to the building (at 141 and 143) and >50% reduction in lateral outward force applied to the building (at 145 and 147). The reaction force was measured at the horizontal beam/exterior wall of building.

To prevent glass from cracking in a polycarbonate/glass laminate, the present invention further provides polycarbonate sheet and laminated panels designed to leave the area occupied by the bolt holes uncovered by the laminated glass layer. After bolts are inserted and the polycarbonate sheet and laminated panels are secured to the supporting system, a protective and aesthetically pleasing cap may be used to cover the exposed areas of the polycarbonate sheet and laminated panels as a prophylaxis against weathering and scratching as well as to cover the protruding and aesthetically unappealing bolts. Optionally, bushings may be placed in the polycarbonate sheet and laminated panel bolt holes prior to inserting the bolts to help avoid glass layer breakage from the polycarbonate sheet and laminated panels' torsional effects and/or the bolts being over torqued during installation.

FIG. 15A shows a cross-sectional view of a glass-clad polycarbonate blast barrier panel having bushings or holes 151 placed in the polycarbonate to avoid cracking the glass in the placement of bolts to connect the panel to a superstructure. Thermoplastic polyurethane layers 153 (0.025 in. (0.635 mm)) are placed between polycarbonate layers 158 (0.125 in. (3.18 mm)) and 159 (0.5 in. (12.7 mm)). Annealed glass layer 157 (0.025 in. (0.635 mm)) rests on thermoplastic polyurethane layer 155 (0.06 in. (1.52 mm)) FIG. 15B provides a perspective view of the same panel and FIG. 15C provides a view of the entire panel.

FIG. 16 is a graph showing displacement of a glass clad polycarbonate blast barrier panel with and without the inventive energy absorber. The maximum inward panel displacement measured at the center of the panel with energy absorber was 5.45 in. (138.37 mm) and the maximum inward panel displacement, again measured at the center of the panel, without energy absorber was 5.50 in. (139.78 mm).

FIG. 17 shows a comparison of the effectiveness of the inventive energy absorber in a glass clad polycarbonate blast barrier panel. As can be appreciated by reference to FIG. 17, the inventive energy absorber provided an "out-of-phase" displacement of the panel and the strut (at points indicated by 171 and 175) to reduce reaction force.

FIG. 18 is a graph showing the reaction force of a glass clad polycarbonate blast barrier panel with energy absorber. As can be appreciated by reference to FIG. 18, the inventive energy absorber provided >60% reduction in lateral inward force applied to the building (at 181 and 183) and >50% reduction in lateral outward force applied to the building at (185 and 187). The reaction force was measured at the horizontal beam/exterior wall of building.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A blast barrier system comprising:
a blast panel;
a beam;
an energy absorber comprising a substantially tubular member extending longitudinally along an axis from a first end portion to a second end portion, each of the first end portion and the second end portion having a substantially similar geometric profile, and the energy absorber having a first side, and a second side located on a substantially opposite side of the absorber from the first side, and each of the first side and the second side are parallel to the axis from the first end portion to the second end portion;
wherein the beam is attached to the first side of the energy absorber, and is substantially parallel to the axis from the first end portion to the second end portion of the energy absorber,
wherein the blast panel is attached to the second side of the energy absorber,
wherein the blast panel flexes when compressed by a blast force, and
wherein the energy absorber collapses under a predetermined load when compressed by a residual blast force.

2. The blast barrier system according to claim 1, wherein the blast panel comprises a thermoplastic polymer.

3. The blast barrier system according to claim 2, wherein the thermoplastic polymer is polycarbonate.

4. The blast barrier system according to claim 3, wherein the blast panel comprises two layers of polycarbonate.

5. The blast barrier system according to claim 4, wherein the two polycarbonate layers are held together with aliphatic thermoplastic polyurethane.

6. The blast barrier system according to claim 1, wherein the blast panel comprises glass.

7. The blast barrier system according to claim 2, wherein the blast panel is glass clad.

8. The blast barrier system according to claim 7, wherein the blast panel has one or more bolt holes placed.

9. The blast barrier system according to claim 7, wherein the glass cladding does not have one or more bolt holes therethrough.

10. The blast barrier system according to claim 1, wherein the beam is attached to a structure, and wherein the energy absorber extends substantially longitudinally along a face of the structure.

11. The blast barrier system according to claim 1, wherein the beam is attached to a structure, and wherein the energy absorber extends substantially horizontally along a face of the structure.

12. The blast barrier system according to claim 1, wherein the geometric profile of the energy absorber is selected from the group consisting of hexagonal, square, circular and oval.

13. The blast barrier system according to claim 1, wherein the absorber is filled with an energy-absorbing foam.

14. The energy absorber according to claim 1, wherein the absorber is filled with an energy-absorbing malleable metal insert.

15. The blast barrier system according to claim 1, wherein the absorber is made from a metal.

16. The blast barrier system according to claim 15, wherein the metal is selected from the group consisting of steel, aluminum and aluminum alloys.

17. The blast barrier system according to claim 1, wherein the beam is made from a metal.

18. The blast barrier system according to claim 17, wherein the metal is selected from the group consisting of steel, aluminum and aluminum alloys.

19. The blast barrier system according to claim 1, wherein the energy absorber is attached to a structure.

20. The blast barrier system according to claim 1, further comprising a strut attached to the second side of the energy absorber and the blast panel.

21. The blast barrier system according to claim 20, wherein the strut is made from a metal.

22. The blast barrier system according to claim 21, wherein the metal is selected from the group consisting of steel, aluminum and aluminum alloys.

* * * * *